Oct. 16, 1962 W. R. EDDY 3,058,431
VALVE
Filed July 11, 1958 2 Sheets-Sheet 1

INVENTOR.
W. R. EDDY
BY Hudson & Young
ATTORNEYS

Oct. 16, 1962   W. R. EDDY   3,058,431
VALVE

Filed July 11, 1958   2 Sheets-Sheet 2

INVENTOR.
W.R. EDDY

BY Hudson E. Young

ATTORNEYS

United States Patent Office 3,058,431
Patented Oct. 16, 1962

3,058,431
VALVE
William R. Eddy, Bartlesville, Okla., assignor to Phillips Petroleum Company, a corporation of Delaware
Filed July 11, 1958, Ser. No. 747,878
5 Claims. (Cl. 103—227)

This invention relates to an improved valve. In one aspect, it relates to a positive displacement pump, the inlet and discharge outlet openings of which are controlled by improved valves. In another aspect it relates to an improved valve provided with a novel valve head, this valve particularly characterized by its ability to effectively control the flow of fluids, particularly fluids bearing solid materials or foreign substances which normally tend to impair the reliability and operation of many valves of the prior art.

The efficient operation of valves used to control the flow of fluids, particularly fluids bearing solids or other clogging foreign materials, often are hampered by the accumulation or deposition of solid material such as sand, rust, silt, various gritty substances, and the like, on the internal working surfaces of the valves. The accumulation of solids on the seats of the valves prevents effective opening and closing of the valves and often results in leakage. Some solids which accumulate on the valve seat have an abrasive effect which necessitates frequent replacement of the valve and/or valve seat because of the resulting wear. The accumulation of solids on the valve seat also tends to cause difficulties in manipulating the valve and tends to cause the valve to stick. The susceptibility of many of the prior art valves to the corrosive, abrasive, or wearing action of solid particles and foreign substances is due to the fact that the internal working surfaces of the valves are generally both made of metal, such as the valve seats and the contacting valve heads.

Accordingly, an object of this invention is to provide an improved valve. Another object is to provide a positive displacement pump, the inlet and discharge outlet openings of which are provided with improved and novel valves. Another object is to minimize the tendency of solid material and foreign substances, such as sand, rust, silt, various gritty substances and the like, which may deposit on the internal working surfaces of the valve, to prevent effective closing and opening of the valve. Another object is to provide an improved valve characterized by its reliable operation and manipulation despite the presence of solid particles and foreign substances carried by the fluid stream desired to be controlled. Further objects and advantages of this invention will become apparent to those skilled in the art from the following discussion, appended claims, and drawing in which:

Figure 2:
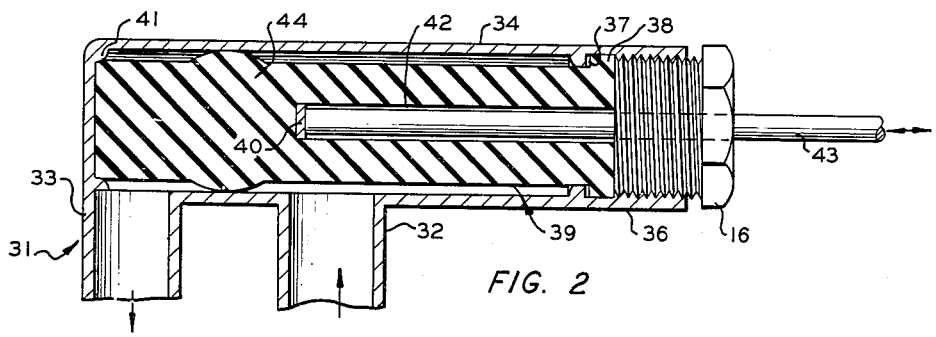
FIGURE 2 is a view similar to FIGURE 1 showing another valve embodiment of this invention.
Figure 4:
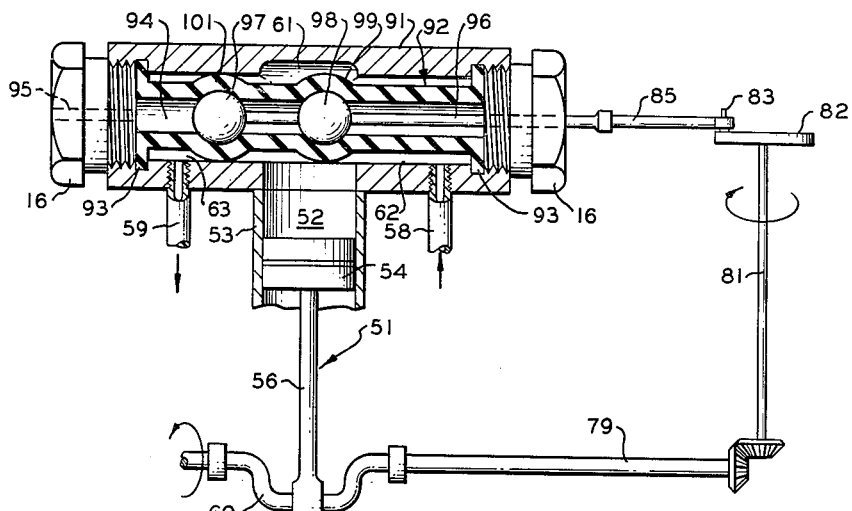
Figure 5:
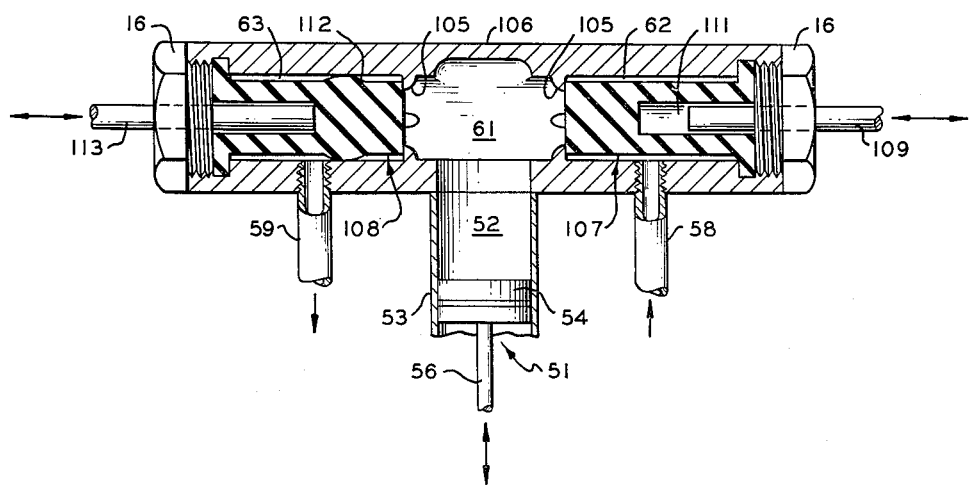

FIGURE 4 is an elevational view in partial section of a positive displacement pump, the inlet and discharge openings of which are provided with an improved valve of this invention; and FIGURE 5 is an elevational view in partial section of a portion of a positive displacement pump, the inlet and discharge openings of which are provided with a pair of valves of this invention similar to that shown in FIGURE 2.

Figure 1:
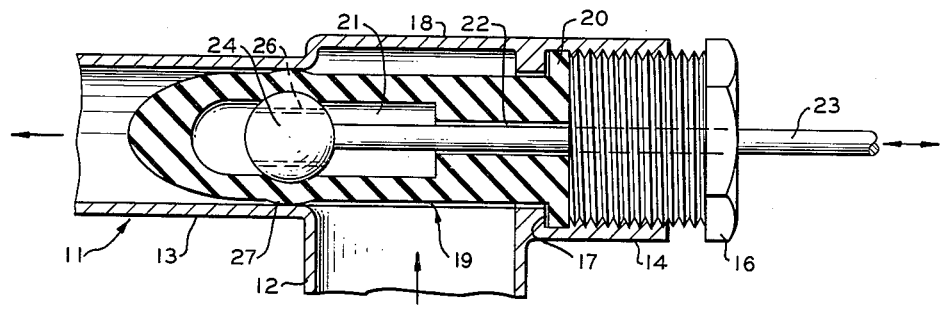
FIGURE 1 is an elevational view in partial section of an improved valve of this invention.

Referring now to the drawing, in which like parts have been designated with like reference numerals, and initially to FIGURE 1, a T connection of a fluid conduit generally designated 11 is shown, this conduit having an upstream portion 12 and a downstream portion 13. Conduit 11 is provided with a nipple 14 having an inner threaded portion adapted to mesh and fit with a threaded gland 16 or the like. The inner end of nipple 14 is provided with a reduced cross-section so as to form an annular shoulder 17. The wall of downstream conduit portion 13 opposite the upstream conduit portion 12 is preferably enlarged at 18. Longitudinally disposed within conduit portion 13 and at right angle to the conduit portion 12 is a resilient or flexible valve head generally designated 19. Valve head 19 is made of rubber or like material capable of limited deformation and able to return to its normal or original shape when not deformed by force. Valve head 19 is generally cylindrical in shape and its outer end is in the form of an enlarged or annular flange 20 which is disposed within the inner end of nipple 14. By reason of shoulder 17 and the tightening of the gland 16 within nipple 14, the valve head 19 is secured in a stationary position. The inner or body portion of valve head 19 has an outer diameter which is slightly smaller than the inner diameter of conduit portion 13, as shown in the drawing. The inner extremity or tip of valve head 19 extends further into conduit portion 13 and is preferably rounded or streamlined, as shown in the drawing. The inner portion of valve head 19 is provided with a cylindrical hollow 21 and the outer body portion of the valve head is provided with an axial passage 22 which communicates with hollow 21, the latter and passage 22 being sealed off from the fluid desired to be controlled. A longitudinally movable or reciprocating actuating rod or stem 23 passes through passage 22, the inner portion of rod 23 disposed within hollow 21. The inner end of rod 23 is enlarged in the shape of a sphere or ball 24, the outer diameter of the latter being slightly larger than the diameter of hollow 21. Ball 24 is preferably provided with one or more longitudinal passages 26 so as to provide communication on both sides of the ball within hollow 21.

In operation, the valve of FIGURE 1 is adapted to move between a first position of no fluid flow and a second position of fluid flow. In its first position, the valve is adapted to close or stop the flow of fluid, shown by the direction arrows, when the ball 24 is in the position shown in the drawing; in this position, the ball 24, having a diameter greater than the diameter of hollow 21, causes the flexible body portion of valve head 19 to bulge at 27 in such a manner that the periphery of the bulged valve head portion engages at all points the inner wall of the conduit portion 13, the wall of the conduit 13 at this point functioning as a valve seat.

It is evident that when the rod 23 is retracted or moved to the right, the ball 24 moves toward the outer end of hollow 21, thereby allowing the original bulging portion 27 of the flexible valve head 19 to return to its normal or original shape. When the rod 23 is thus retracted, the valve occupies its second position of fluid flow by reason of the clearance now formed between the outer peripheral portion of the valve head 19 and the adjacent wall of conduit portion 13, this clearance being in communication with the inlet or upstream end of the conduit.

The valve rod 23 can be actuated by any suitable means, such as hydraulic, mechanical, electrical, or even manual means. Should solid materials or foreign substances tend to deposit or accumulate on those portions of the conduit functioning as a valve seat, the presence of these solids will not materially affect the operability of the valve shown in FIGURE 1. Since valve head 19 is made of a flexible material, such as rubber, the presence of such particles or solids on the valve seat will merely indent the adjacent portions of the flexible valve head without preventing complete contact between the valve head and the adjacent valve seat. These particles will be swept through or dislodged from the valve seat upon the next stroke of the valve actuating rod. Thus, even if solids deposit on the valve seat, their presence does not hamper the efficiency of the valve or cause any leakage when the valve head is seated.

In FIGURE 2, a fluid conduit 31 is shown having an upstream portion 32 and a downstream portion 33 parallel thereto. Alternatively, conduit portion 33 can be perpendicular to conduit portion 32. Conduit 31 is provided with a connection 34 which serves as a valve housing, one end of which extends at a right angle to the conduits and serves as a nipple 36. The inner portion of nipple 36 is provided with threads which are adapted to mesh and fit with gland 16. Nipple 36 is provided with an inner annular wall 37, preferably having a beveled opening as shown in the drawing, this wall functioning as an annular shoulder which together with gland 16 serves to fix in position the outer flanged end 38 of a flexible valve head 39, made of rubber or the like. Valve head 39 is substantially cylindrical in shape and has an inner end which is secured by reason of an annular enlargement 41 provided at the inner wall of conduit portion 33. Where conduit portion 33 is disposed at a right angle with respect to conduit portion 32, it can be provided with a spider or other perforated stop means in place of annular enlargement 41. The outer diameter or periphery of valve head 39 is slightly smaller than the inner diameter of the valve housing or conduit connection 34. Valve head 39 is provided with an axial passage 42 which extends about halfway or so from the outer or right end of the valve head 39. Reciprocally disposed within passage 42 is an actuating or reciprocating rod 43 which can be similarly operated like that of rod 23 of FIGURE 1. The inner end of hollow 42 can be provided with a suitable plate 40, made of metal or the like, so as to prevent the inner end of rod 43 from wearing the adjacent portion of the valve head when rod 43 exerts a force thereon.

In operation, the valve shown in FIGURE 2 is adapted to move between a first position of no fluid flow and a second position of fluid flow. When the actuating rod 43 is pushed or moved within passage so that its end contacts the valve head 39 and exerts a force thereon, it causes the right half of valve head 39 to stretch and the left half of the valve head to bulge at 44, as shown in the drawing. In this position, the valve is in its position of no fluid flow and the outer extremity or periphery of the bulge 44 completely contacts the adjacent inner wall of conduit connection 34, this portion of the conduit functioning as a valve seat, thereby preventing fluid from flowing from conduit portion 32 to conduit portion 33. When the actuating rod 43 is retracted, or moved to the right, the bulged portion 44 tends to return to its normal or original shape so as to provide a clearance between the valve head 39 and the wall of the conduit connection 34, this clearance then being in communication with both the upstream conduit portion 32 and the downstream conduit portion 33, thereby allowing fluid flow. As with the valve of FIGURE 1, deposition or accumulation of solids or foreign substances on the valve seat will not hamper the effective closing or opening of the valve.

Figure 3:
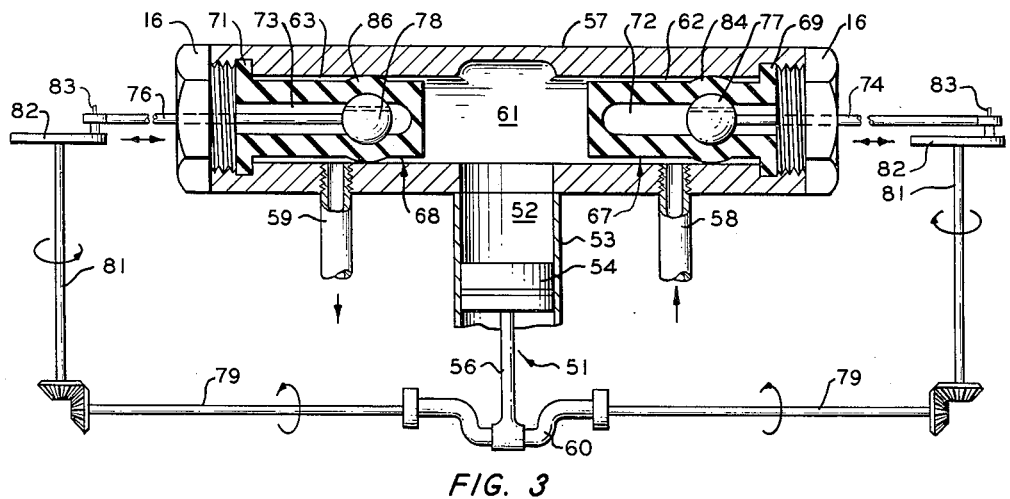
FIGURE 3 is an elevational view in partial section of a portion of a positive displacement pump, the inlet and discharge openings of which are provided with a pair of valves of this invention similar to that shown in FIGURE 1.

Referring now to FIGURE 3, a positive displacement pump is schematically shown as 51, this pump having a pump chamber 52 defined by wall 53. Reciprocally movable within pump chamber 52 is an actuating piston 54 or the like, which is secured to and operated by a suitable connecting rod 56 or the like, the latter in turn being actuated by a suitable crankshaft 57 or the like. The pump is provided with a valve housing 60, one side of which is operatively connected to pump inlet connection 58, and the other side of which is provided with a pump discharge connection 59. Valve housing 60 is provided with an intermediate valve chamber 61 which is normally in communication with a right or inlet valve chamber 62 and a left or discharge valve chamber 63. Intermediate valve chamber 61 is disposed opposite that of pump chamber 52 and has an inner diameter preferably larger than the diameters of valve chambers 62, 63. Both ends or extremities of valve housing 60 are provided with threaded openings in which are threaded or secured gland members 16, these openings having a diameter slightly larger than the corresponding diameter of valve chambers 62, 63.

Longitudinally disposed within valve chambers 62, 63 are a pair of flexible valve heads 67, 68, respectively, these valve heads being similar to that shown in FIGURE 1. Valve heads 67, 68, the inner ends of which can be rounded or streamlined, are longitudinally secured in a stationary position by reason of their outer enlarged flanged ends 69, 71 and the adjacent shoulder portions of their valve housings and glands 16.

The outer diameters or peripheries of valve heads 67, 68 are slightly smaller than the diameters of valve chambers 62, 63, respectively.

Disposed within hollows 72, 73 of valve heads 67, 68, respectively, are actuating arms or stems 74, 76, the inner extremities of the latter being provided with enlarged portions in the form of balls 77, 78, respectively, the diameters of the latter being slightly larger than the diameter of the respective hollows 72, 73. Actuating arms 74, 76 are adapted to be actuated or reciprocated in proper sequence by means of a suitable mechanical train or the like, such as operatively rotatable shafts 79 and 81, eccentric plates 82, and pins 83; as shown in the drawing, this mechanical train can be operatively connected to and actuated by the pump crankshaft 57. Alternatively, the rods 74, 76 can be operated by hydraulic, electrical or manual means.

In operation, each valve head 67, 68 is adapted to move between a first position of no fluid flow and a second position of fluid flow. When valve head 67 is in its position of fluid flow, actuating arm 74 is in its retracted position and the bulge 84 in the flexible valve head 67 is in the position shown in the drawing, thereby providing a clearance between the valve head 67 and the adjacent wall defining valve chamber 62, this clearance being in communication with the inlet connection 58 and the pump chamber 52. When valve head 67 is in its position of fluid flow, pump piston 54 is on its downstroke, allowing fluid from inlet connection 58 to fill the pump chamber 52. When the actuating arm 74 is pushed further within hollow 72, the ball 77 causes the valve head 67 to enlarge or bulge at a point downstream of the inlet connection 58, thereby completely closing off the inlet connection 58 from the pump chamber 52, the valve in this position occupying a position of no fluid flow. When the valve 67 is in its position of fluid flow, the valve 68 is in its position of no fluid flow as shown in the drawing, the bulge 86 in the valve head 68 completely closing off the communication between the discharge or outlet connection 59 and the pump chamber 52. When the actuating arm 76 of valve head 68 is retracted, the ball 78 then occupies a position to the left of the outlet connection 59, thereby providing a clearance or communication between the discharge connection 59 and the pump chamber 62. When valve head 68 is in its position of fluid flow, valve head 67 is in its position of no fluid flow, and pump piston 54 is on its upstroke, causing discharge of fluid from pump chamber 52 via outlet connection 59.

Referring now to FIGURE 4, the pump chamber 52 of the positive displacement pump 51 communicates with the enlarged intermediate valve chamber 61 defined by a valve housing 91. Longitudinally disposed within the valve housing 91 is a flexible valve head 92, both ends of which are secured in position by reason of enlarged flanged end portions 93 and glands 16, the left gland being provided with a suitable vent 95. As before, the outer diameter or periphery of valve head 92 is slightly smaller than the diameters defining valve chambers 62, 63. The hollow 94 of the valve head 92 extends the entire length thereof and disposed within this hollow is an actuating rod 96, the inner end of which is provided with an enlarged ball portion 97. The actuating arm 96 is provided with a second enlarged ball portion 98, spaced back from the first ball 97. The diameters of balls 97, 98 are slightly larger than the normal diameter of the hollow 94 and the reciprocal movement of the rod 96 within the hollow 94 causes the balls 97, 98 to enlarge the adjacent flexible portions of the valve head 92 so as to form bulges 99, 101, respectively. When the valve head 92 is in its first position, fluid is allowed to flow from the pump inlet connection 58 and thence into the pump chamber 52, as shown in the drawing. In this position, the valve head 92 is enlarged or bulged at 101 so as to completely close off communication between the pump discharge connection 59 and the pump chamber 52. In this position, the enlarged or bulged portion 99 is disposed within the valve chamber 61, as shown in the drawing, so as to permit fluid to flow from inlet connection 58 into pump chamber 52 on the downstroke of piston 54. When the valve rod 96 is retracted, the valve head 92 then occupies a position such that communication between inlet connection 58 and pump chamber 52 is prevented, and communication is established between the discharge connection 59 and the pump chamber 52, thereby allowing fluid to be discharged from pump chamber 52 on the upstroke of piston 54. In this latter position, the bulge 101 now is disposed within valve chamber 61 and the bulge 99 is disposed within the right valve chamber 62 so as to contact the wall defining the same and close off the communication of the inlet connection 58 with pump chamber 52. As before, rod 96 can be actuated by any suitable means, such as a mechanical train comprising rotatable shafts 79, 81, eccentric plate 82, pin 83, and pitman 85, this train being operatively connected to pump crankshaft 57.

Referring now to FIGURE 5, valve housing 106 is provided with a pair of flexible valve heads 107, 108, these being similar to that of FIGURE 2. Valve housing 106 is provided with internal stop means such a spiders 105 or the like which are disposed adjacent the inner ends of valve heads 107, 108. When valve head 107 is in its position as shown in the drawing, communication is established between the inlet connection 58 and the pump chamber 52, the actuating rod 109 being in its retracted position as shown, and fluid being allowed to fill pump chamber 52 on the downstroke of piston 54. When actuating rod 109 is pushed within the hollow 111 of the valve head 107, the inner portion of the valve head 107 is enlarged in the form of a bulge downstream of inlet connection 58, thereby preventing communication of the latter with pump chamber 52. When the valve head 107 is in its position of fluid flow as shown in the drawing, the valve head 108 is in its position of no fluid flow as shown in the drawing. Valve head 108 in its latter position prevents communication between the discharge connection 59 and the pump chamber 52 by reason of bulge 112. When the valve actuating rod 113 is retracted, the bulge 112 returns to its normal or original shape, thereby providing a clearance so as to establish communication between the discharge connection 59 and the pump chamber 52 and allowing fluid to be discharged on the upstroke of piston 54. Rods 109, 113 can be operatively actuated in sequence by any of the aforementioned means.

Various modifications and alteration of this invention will become apparent to those skilled in the art from the foregoing discussion and drawing without departing from the scope and spirit of this invention, and it should be understood that this invention is not to be unduly limited thereto.

I claim:

1. A valve comprising, in combination, a cylindrical housing defining a cylindrical valve chamber, lateral inlet means communicating with said chamber, outlet means communicating with the dowstream end of said chamber, a cylindrical flexible valve head axially positioned within said chamber, said valve head normally having an outer diameter slightly smaller than the diameter of said chamber so as to provide a clearance therebetween when said valve head is in its normal shape and allow fluid communication between said inlet and outlet means, the upstream end of aid valve head having an enlarged flanged portion, said housing having an internally threaded open end adjacent said flanged portion and an annular shoulder, a gland threadedly fitting said threaded open end and adapted together with said shoulder to fix said valve head in its axial position within said chamber, said valve head having an axial passage extending from the upstream end of said valve head to a point intermediate the ends of said valve head, and actuating rod means passing through said gland means and said upstream end of said valve head and reciprocally movable within said passage with the inner end of said rod means disposed within said hollow, said inner end of said rod means having an enlarged spherical portion having a diameter lightly larger than said hollow and adapted to slidably move therein, said rod means adapted to reciprocally move between a first position of no fluid flow and a second position of fluid flow, said spherical portion adapted to cause the adjacent portion of said valve head to bulge when said rod means is in its first position in such a manner that the peripheral portion of said bulged valve head portion contacts the adjacent portion of said housing and prevents fluid communication between said inlet and outlet means, said spherical portion adapted when said rod means is in its second position to occupy a position so as to permit fluid communication between said inlet and outlet means.

2. In combination with a pump having a pump chamber and inlet and outlet means, a valve comprising, in combination, a valve housing defining a valve chamber communicating at its intermediate portion with said pump chamber, one end portion of said valve chamber normally communicating with said inlet means and the other end portion of said valve chamber normally communicating with said outlet means, flexible valve head means disposed in a fixed position within said valve chamber, said valve head means in its normal shape being out of contact with said housing between said inlet and outlet means, said valve head having a hollow therein, first actuating rod means reciprocally movable within said hollow and adapted to move between a first position of no fluid flow and a second position of fluid flow, said first actuating rod means in its first position adapted to exert a force on said valve head radially bulging the same so as to contact said housing in a position to prevent fluid communication between said inlet means and said pump chamber and in its second position adapted to permit fluid communication between said inlet means and said pump chamber, and second actuating rod means reciprocally movable within said hollow and adapted to move between a first position of no fluid flow and a second position of fluid flow, said second actuating rod means in its first position adapted to exert a force on said valve head radially bulging the same so as to contact said housing in a position to prevent fluid communication between said outlet means and said pump chamber and in its second position adapted to permit fluid communication between said outlet means and said pump chamber, said first actuating rod means adapted to occupy its first position when said second actuating rod means occupies its second position, said first actuating rod means adapted to occupy its second position when said second actuating rod means occupies its first position.

3. In combination with a pump having a pump chamber and inlet and outlet means, a valve comprising, in combination, a cylindrical valve housing defining a cylindrical valve chamber having an intermediate portion communicating with said pump chamber, the opposite end portions of said valve chamber functioning as an inlet valve chamber and an outlet valve chamber, said inlet valve chamber having a lateral opening communicating with said inlet means and said outlet valve chamber having a lateral opening communicating with said outlet means, a first cylindrical flexible valve head axially positioned within said inlet valve chamber, a second flexible cylindrical flexible valve head axially positioned within said outlet valve chamber, said first and second valve heads normally having outer diameters slightly smaller than their respective valve chambers so as to provide clearances therebetween when said valve heads are in their normal shapes and allow communication between said pump chamber and the respective lateral openings, said housing having internally threaded openings at either end and internal annular shoulders adjacent thereto, each of said valve heads having enlarged flanged outer end portions respectively disposed adjacent one of said shoulders, gland means threadedly fitting each of said threaded openings and together with the respective said shoulders adapted to maintain respective valve heads in fixed position within their respective valve chambers, axial hollows within each of said valve heads, first and second actuating rod means each axially passing through one of said gland means and reciprocally movable with the hollows of said first and second valve heads respectively, the inner ends of each of said rod means having an enlarged spherical portion with a diameter slightly larger than the respective hollow in which it is slidably disposed, each of said spherical portions adapted to bulge the respective adjacent valve head into contact with the adjacent valve housing when the respective rod means is in a first position so as to prevent fluid communication between said pump chamber and the respective lateral opening and each of said spherical portions adapted to permit such communication when the respective rod means is in a second position, said first rod means adapted to occupy its first position when said second rod means is in its second position, said first rod means adapted to occupy its second position when said first rod means is in its first position.

4. In combination with a pump having a pump chamber and inlet and outlet means, a valve comprising, in combination, a cylindrical valve housing defining a cylindrical valve chamber having an intermediate portion communicating with said pump chamber, the opposite end portions of said valve chamber functioning as an inlet valve chamber and an outlet valve chamber, said inlet valve chamber having a lateral opening communicating with said inlet means and said outlet valve chamber having a lateral opening communicating with said outlet means, a first cylindrical flexible valve head axially positioned within said inlet valve chamber, a second flexible cylindrical flexible valve head axially positioned within said outlet valve chamber, said first and second valve heads normally having outer diameters slightly smaller than their respective valve chambers so as to provide clearances therebetween when said valve heads are in their normal shapes and allow communication between said pump chamber and the respective lateral openings, said housing having internally threaded openings at either end and internal annular shoulders adjacent thereto, each of said valve heads having enlarged flanged outer end portions respectively disposed adjacent one of said shoulders, gland means threadedly fitting each of said threaded openings and together with the respective said shoulders adapted to maintain respective valve heads in fixed position within their respective valve chambers, axial hollows within each of said valve heads, first and second actuating rod means each axially passing through one of said gland means and reciprocally movable with the hollows of said first and second valve heads respectively, the inner ends of each of said rod means adapted to exert a force on the respective valve head and cause the latter to bulge into contact with the adjacent valve housing when the respective rod means is in a first position so as to prevent fluid communication between said pump chamber and the respective lateral opening and said inner ends of said rod means adapted to remain out of contact with the respective valve head when the respective rod means is in its second position so as to permit such communication, said first rod means adapted to occupy its first position when said second rod means is in its second position, said first rod means adapted to occupy its second position when said first rod means is in its first position.

5. In combination with a pump having a pump chamber and inlet and outlet means, a valve comprising, in combination, a cylindrical valve housing defining a cylindrical valve chamber having an enlarged cross-sectional intermediate portion communicating with said pump chamber, the opposite end portions of said valve chamber functioning as an inlet valve chamber and an outlet valve chamber, said inlet valve chamber having a lateral opening communicating with said inlet means and said outlet valve chamber having a lateral opening communicating with said outlet means, a flexible cylindrical valve member axially positioned within said chamber and normally having an outer diameter slightly smaller than the diameter of said valve chamber so to provide a clearance therebetween when said valve member is in its normal shape and allow communication between said pump chamber and the lateral openings, said housing having internally threaded openings at either end and internal annular shoulders adjacent thereto, each of the ends of said valve member having enlarged flanged outer end portions respectively disposed adjacent one of said shoulders, gland means threadedly fitting each of said threaded opening and together with the respective said shoulders adapted to maintain said valve member in fixed position within said valve chamber, said valve member having an axial hollow substantially extending the length thereof, an axial actuating rod passing through one of said gland means and reciprocally movable within said hollow, a first enlarged spherical portion adjacent the inner end of said rod, and a second enlarged spherical portion on said rod spaced from said first spherical portion, said spherical portions having diameters slightly larger than the diameter of said hollow and each in a first position adapted when disposed in said hollow adjacent either side of said enlarged intermediate valve chamber to bulge said valve member into contact with the adjacent housing and prevent fluid communication between said pump chamber and the respective lateral opening, each of said spherical portions in a second position adapted to occupy a position adjacent said enlarged intermediate valve chamber so as to permit fluid communication between said pump chamber and the adjacent respective lateral opening, said first and second spherical portions adapted to occupy one of said first and second positions when the other occupies the other of said positions.

References Cited in the file of this patent

UNITED STATES PATENTS

| | | |
|---|---|---|
| 421,346 | Berrenberg | Feb. 11, 1890 |
| 898,461 | Greleck | Sept. 15, 1908 |
| 1,120,707 | Froehlick | Dec. 15, 1914 |
| 1,162,189 | Quinn | Nov. 30, 1915 |
| 1,597,068 | Donald et al. | Aug. 24, 1926 |
| 2,001,336 | Vago et al. | May 14, 1935 |
| 2,028,138 | Coulling | Jan. 21, 1936 |
| 2,356,738 | Brugger | Aug. 29, 1944 |
| 2,367,883 | Miller | Jan. 23, 1945 |
| 2,449,481 | Hufferd et al. | Sept. 14, 1948 |
| 2,669,253 | Hansen | Feb. 16, 1954 |
| 2,755,671 | DeLany | July 14, 1956 |
| 2,888,952 | Klaren et al. | June 2, 1959 |
| 2,948,504 | Merrill | Aug. 9, 1960 |

OTHER REFERENCES

German application P7,480 (KL 47 g 40), Mar. 22, 1956.